Sept. 6, 1955     A. E. WILLIAMS     2,717,225
SINTERED REFRACTORY MASS
Filed Aug. 25, 1949

ALBERT ETHERIDGE WILLIAMS
Inventor

By

Roberts B Larson    Attorney

United States Patent Office 2,717,225
Patented Sept. 6, 1955

2,717,225

SINTERED REFRACTORY MASS

Albert Etheridge Williams, London, England

Application August 25, 1949, Serial No. 112,215

Claims priority, application Great Britain August 30, 1948

6 Claims. (Cl. 154—128)

This invention relates to refractory masses prepared by sintering refractory compounds, especially oxides, and has for object to provide a method of joining two or more such masses without the use of a bonding agent or cement.

According to the invention sintered masses of refractory compounds, for example oxides, are joined together by maintaining the masses in contact with each other by application of a moderate pressure while they are at sintering temperature.

Also in accordance with the invention sintered masses of refractory oxide are formed by heating the said oxide to a sintering temperature, while subjecting it to a moderate compacting pressure, and the said masses are subsequently joined together by heating the masses to the said sintering temperature while maintaining the masses in contact with each other by application of moderate pressures.

Preferably in accordance with the invention the sintered masses are subjected to an applied pressure of about ½ to 1 ton per square inch of the surface of contact of the masses for about 10 minutes, and the temperature employed may be from about 1400° C. to 2000° C. depending upon the densities required. It is advantageous to effect the union of the sintered masses at substantially the temperature at which the masses were sintered, and in the case of joining dissimilar masses produced at different temperatures it is preferred to carry out the invention at substantially the lower or lowest of the said different temperatures.

Examples of refractory oxides to which the invention may be applied are beryllia, alumina, thoria, magnesia. A sintered mass of one refractory oxide may be joined to a sintered mass of another refractory oxide by means of the invention.

In carrying the invention into effect according to a preferred method, two sintered bodies of beryllia were heated by means of high frequency current induced in a graphite mould provided with plungers by means of which pressure could be applied to the bodies. When the temperature of the bodies had reached substantially 1500° C. pressure equivalent to 1 ton per square inch of the contacting surfaces of the bodies was applied to the plungers for 10 minutes. The mould was then allowed to cool and the charges withdrawn. In this manner a coating of porous beryllia has been applied to a sphere of dense beryllia.

Apparatus which may be employed in carrying out the invention is illustrated in the accompanying drawings in which.

Figure 1:
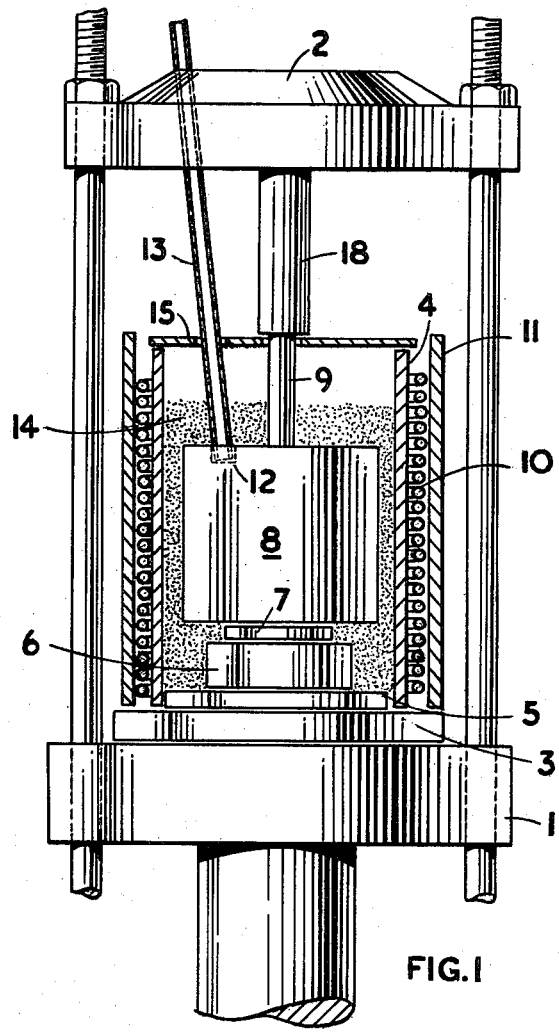
Fig. 1 is a view in elevation of part of a hydraulic press carrying a mould assembly.
Figure 2:
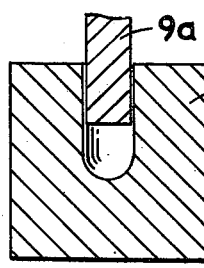
Fig. 2 is a sectional view of one form of mould.

In the drawing the lower platen 1 of a hydraulic press carries sindanyo sheets 3 on which rest a silica or alumina tube 4 within which is arranged a further sindanyo sheet 5, a magnesia block 6 and a graphite block 7. The latter supports a graphite mould 8, substantially cylindrical in form. A graphite plunger 9 entering the mould and a block 18 serves to transmit the load from the upper platen 2 of the hydraulic press. Around the tube 4 is arranged a high frequency heating coil 10, which coil is surrounded by an insulating layer 11 of mica. A shallow hole 12 is provided in the upper wall of the mould 8 for admission of the end of a graphite sighting tube 13, which allows temperature measurements to be taken of the mould by means of a suitable pyrometer. The mould 8 is surrounded by packed magnesia 14 when in use and a sindanyo sheet 15, having appropriate apertures for the sighting tube 13 and plunger 9 is fitted over the tube 4, so as to reduce radiation loss and prevent dust being carried into the atmosphere by convection. The mould 8A (Fig. 2) is suitable for the preparation of hemispheres of sintered refractory material of high density, the plunger 9a of graphite having a plane lower face. The mould 8B of graphite has a cylindrical bore 16 receiving the plungers 9b and 17. The inner ends of the plungers are hemispherical, so that they may be employed for compressing two hemispheres together.

In employing the apparatus a mould 8A and plunger 9A (Fig. 2) is coated with colloidal graphite in acetone, to protect the mould from oxidation on the outside and to give a smooth surface on the inside. The colloidal graphite on the inside of the mould and the ends of the plungers is polished to give a smooth, shiny surface. Refractory oxide is introduced into the mould, the plunger inserted and the mould placed on the graphite block 7 within the tube 4. The sighting tube is placed in position and magnesia insulating powder packed between the tube 4 and the mould and finally over the mould. A small load is then placed on the plunger and the heating commenced. When the temperature reaches substantially 1500° C. a pressure of about 1 ton per square inch is applied for about 10 minutes and the electrical energy is shut off. After cooling the sintered hemisphere may be removed from the mould.

Figure 3:
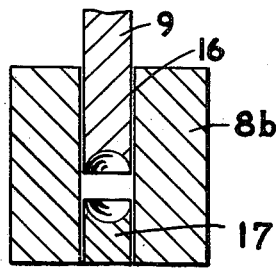
Fig. 3 is a sectional view of a further form of mould.

To prepare a sphere from two such hemispheres the mould 8b and plungers 9 and 17 (Fig. 3) are employed. The mould prepared as above has plunger 17 inserted, then a hemisphere curved face downwards, a further hemisphere plane face downwards and the plunger 9. The mould is then placed on the graphite block 7 as before and sighting tube 13, magnesia 14 and sheet 15 arranged as described above. Heating current is then switched on and when a temperature of substantially 1500° C. is reached pressure of approximately 1 ton per square inch is applied for ten minutes. The heating is discontinued, the mould cooled and the sphere removed. The hollow hemispheres of the plungers in this case should be a small amount, e. g. about 0.01 inch short in the axial direction so as to ensure that pressure is maintained between the contacting plane faces of the hemispherical oxide masses during the treatment.

Hemispherical shells may be prepared by employing the mould 8A with a plunger having on its end an annular plane portion surrounding a hemispherical cap of a radius which is less than the radius of the hemisphere of the mould by an amount corresponding to the desired thickness of the shell. A pair of such shells may then be joined round a sintered sphere of a size corresponding to the inside of the shells, the sphere being prepared as described above. Union of the shell is effected in the manner described above for uniting hemispheres. In employing a plunger with a convex surface at its lower end, it is necessary to withdraw the plunger after cutting off the electric current and before cooling to avoid damage to the refractory mass on contracting.

Where a graphite container is employed to hold the sintered masses during treatment according to the invention, a tendency of the refractory oxide treated to react with the graphite to form a carbide may be a limiting factor in choice of temperature.

I claim:

1. A method of joining pre-sintered shaped bodies of refractory oxide together while retaining their configurations which comprises maintaining the bodies in contact with each other by application of a pressure of about ½ to 1 ton per square inch of contacting surface while they are at a sintering temperature in the range 1400° C. to 2000° C.

2. A method of joining pre-sintered shaped bodies of refractory oxides of metals of the group consisting of berryllium, aluminium, thorium and magnesium, while retaining their configuration which method comprises maintaining the bodies in contact with each other by application of a pressure of about ½ to 1 ton per square inch of contacting surface while they are at a sintering temperature in the range 1400° C. to 2000° C.

3. A method of producing beryllia bodies wherein hemispherical shells of sintered beryllia are joined about a sphere of sintered beryllia to form a sheath on the said sphere, the method comprising uniting the said hemispherical shell about the said sphere by pressing them together by a moderate pressure of about ½ to 1 ton per square inch of contacting surface while heated to a sintering temperature of about 1500° C.

4. A method according to claim 3 wherein the temperature employed is substantially that at which the shells were sintered.

5. A method of producing a shaped body of dense sintered refractory oxide which comprises forming separate parts of the said body by heating the oxide to a sintering temperature in the range 1400° C. to 2000° C. while subjected to a moderate compacting pressure of about ½ to 1 ton per square inch of contact surface, and then joining parts of the body by heating them to substantially the temperature employed for the initial sintering while maintaining the parts in contact with each other by application of a moderate pressure of aboout ½ to 1 ton per square inch of contact surface.

6. A method of joining pre-sintered shaped bodies of beryllia prepared at about 1500° C. which method comprises maintaining the bodies in contact with each other by application of a moderate pressure of about ½ to 1 ton per square inch while they are at a temperature which is substantially that employed for sintering the said bodies.

References Cited in the file of this patent

UNITED STATES PATENTS

| | | |
|---|---|---|
| 1,547,399 | Kaufmann et al. | July 28, 1925 |
| 1,567,445 | Lubowsky | Dec. 29, 1925 |
| 1,904,568 | Taylor | Apr. 18, 1933 |
| 2,091,569 | Ridgway et al. | Aug. 31, 1937 |
| 2,095,982 | Heany | Oct. 19, 1937 |
| 2,167,544 | De Bats et al. | July 25, 1939 |
| 2,195,297 | Engle | Mar. 26, 1940 |
| 2,228,235 | Pfanstiehl | Jan. 7, 1941 |
| 2,341,860 | Ellis | Feb. 15, 1944 |
| 2,520,376 | Roup et al. | Aug. 29, 1950 |
| 2,566,117 | Christie et al. | Aug. 28, 1951 |

FOREIGN PATENTS

| | | |
|---|---|---|
| 280,907 | Great Britain | Mar. 1, 1928 |
| 565,520 | Great Britain | Nov. 14, 1944 |